(12) United States Patent
Zhao et al.

(10) Patent No.: US 9,291,839 B2
(45) Date of Patent: Mar. 22, 2016

(54) LASER REPAIRING APPARATUS AND LASER REPAIRING METHOD FOR SUBSTRATE

(75) Inventors: Haisheng Zhao, Beijing (CN); Guoxiao Bai, Beijing (CN); Weisong Yang, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 298 days.

(21) Appl. No.: 13/699,567

(22) PCT Filed: Aug. 15, 2012

(86) PCT No.: PCT/CN2012/080173
§ 371 (c)(1),
(2), (4) Date: Nov. 21, 2012

(87) PCT Pub. No.: WO2013/023597
PCT Pub. Date: Feb. 21, 2013

(65) Prior Publication Data
US 2013/0105451 A1    May 2, 2013

(30) Foreign Application Priority Data

Aug. 16, 2011  (CN) .......................... 2011 1 0236274

(51) Int. Cl.
*B23K 26/14*  (2014.01)
*G02F 1/13*  (2006.01)
*B23K 26/38*  (2014.01)

(52) U.S. Cl.
CPC .............. *G02F 1/1303* (2013.01); *B23K 26/38* (2013.01)

(58) Field of Classification Search
CPC .............................. G02F 1/1303; B23K 26/38
USPC ............... 219/121.6, 121.65, 121.66, 121.69, 219/121.7, 121.75, 121.76; 349/39, 43, 54, 349/55, 114, 124, 139
See application file for complete search history.

(56) References Cited

U.S. PATENT DOCUMENTS

| 5,661,744 A | 8/1997 | Murakami et al. |
| 2001/0009251 A1* | 7/2001 | Sekizawa et al. ........ 219/121.73 |

(Continued)

FOREIGN PATENT DOCUMENTS

| CN | 1122737 A | 5/1996 |
| CN | 1570743 A | 1/2005 |

(Continued)

OTHER PUBLICATIONS

Second Chinese Office Action dated Jul. 3, 2014; Appln. No. 201110236274.7.

(Continued)

*Primary Examiner* — Thien S Tran
(74) *Attorney, Agent, or Firm* — Ladas & Parry LLP

(57) ABSTRACT

According to embodiments of the present invention, there are disclosed a laser repairing apparatus and a laser repairing method for a substrate. The laser repairing apparatus comprises: a laser emitter; and a light transmission sheet with a light-shielding pattern, wherein a laser emitted by the laser emitter is used to cut a superfluous remainder of an electrode on the substrate, the light transmission sheet is located between the laser emitter and the substrate, and as compared with a pattern of the electrode on the substrate, the light-shielding pattern on the light transmission sheet has the same shape and a size at a predetermined ratio.

11 Claims, 4 Drawing Sheets

(56) References Cited

U.S. PATENT DOCUMENTS

2002/0024671 A1\* 2/2002 Suzuki et al. ................. 356/401
2006/0065645 A1\* 3/2006 Nakasu et al. ........... 219/121.68
2011/0130000 A1 6/2011 Park et al.

FOREIGN PATENT DOCUMENTS

| CN | 1755437 A | 4/2006 |
| CN | 101666923 A | 3/2010 |
| CN | 102626829 A | 8/2012 |
| JP | 05-027111 A | 2/1993 |
| JP | 10-026773 A | 1/1998 |

OTHER PUBLICATIONS

International Search Report mailed Nov. 29, 2012; PCT/CN2012/080173.
First Chinese Office Action dated Jan. 24, 2014; Appln. No. 201110236274.7.
International Preliminary Report on Patentability dated Feb. 18, 2014; Appln. No. PCT/CN2012/080173.
Chinese Rejection Decision Appln. No. 201110236274.7; Dated Apr. 23, 2015.

\* cited by examiner

LASER REPAIRING APPARATUS AND LASER REPAIRING METHOD FOR SUBSTRATE

FIELD OF THE INVENTION

Embodiments of the present invention relate to a laser repairing apparatus and a laser repairing method for a substrate.

BACKGROUND

With an unceasing development of the electronic technology, the liquid crystal display has become a common display device. A substrate in the liquid crystal display comprises electrode layers, which are specifically classified into a gate layer, a source layer, and a drain layer, etc. After manufacture of the electrode layers ends, there are often superfluous remainders. "Superfluous remainders" here means a superfluous conductive layer part except that for forming a normal electrode pattern, after the electrode layers are formed. These superfluous remainders damage the normal electrode pattern, as shown in FIG. 1.

In view of this situation, a laser cutting method is generally adopted for repair, i.e. a laser is used to cut off the superfluous remainders, and the part is cut into the normal electrode pattern. An existing repairing method is that a very small laser beam is used to cut little by little. If an electrode in FIG. 1 needs repairing, it is necessary that many lines be cut to cut out the normal electrode pattern, and the location of the laser beam be precisely adjusted for each cutting, which is similar to the case where an electrode pattern is drawn by an operator little by little.

As discovered by inventor(s) in the course of achieving the present invention, there are at least the following issues in the prior art: it is necessary that in the existing repairing method, the operator cut many times, and the location of the laser beam be precisely adjusted for each cutting, leading to a technical problem that the speed of repairing the electrode is too slow.

SUMMARY

According to an embodiment of the present invention, there is disclosed a laser repairing apparatus for a substrate, comprising: a laser emitter; and a light transmission sheet with a light-shielding pattern, wherein a laser emitted by the laser emitter is used to cut a superfluous remainder of an electrode on the substrate, the light transmission sheet is located between the laser emitter and the substrate, and as compared with a pattern of the electrode on the substrate, the light-shielding pattern on the light transmission sheet has the same shape and a size at a predetermined ratio.

According to another embodiment of the present invention, there is disclosed a laser repairing method for a substrate, comprising: selecting a light transmission sheet with a light-shielding pattern according to a pattern of an electrode on the substrate to be repaired, wherein, as compared with the pattern of the electrode, the light-shielding pattern has the same shape and a size at a predetermined ratio; placing the light transmission sheet between a laser emitter and the substrate; adjusting the location of the light transmission sheet or the substrate, so that a pattern which is projected by the light-shielding pattern onto the substrate upon irradiation with a laser emitted by the laser emitter coincides with the pattern of the electrode; and emitting the laser toward a superfluous remainder on the electrode by the laser emitter.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

FIG. 5 is a schematic view and is not intended to show any detail beyond a light transmission sheet disposed on a lens.

DETAILED DESCRIPTION

In order to make objects, technical details and advantages of the embodiments of the invention apparent, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Embodiment 1

Figure 1:
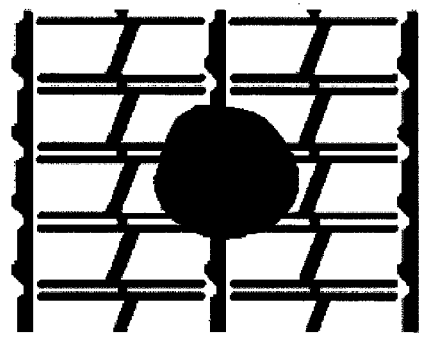
FIG. 1 is a schematic view showing a superfluous remainder on an electrode.
Figure 2:
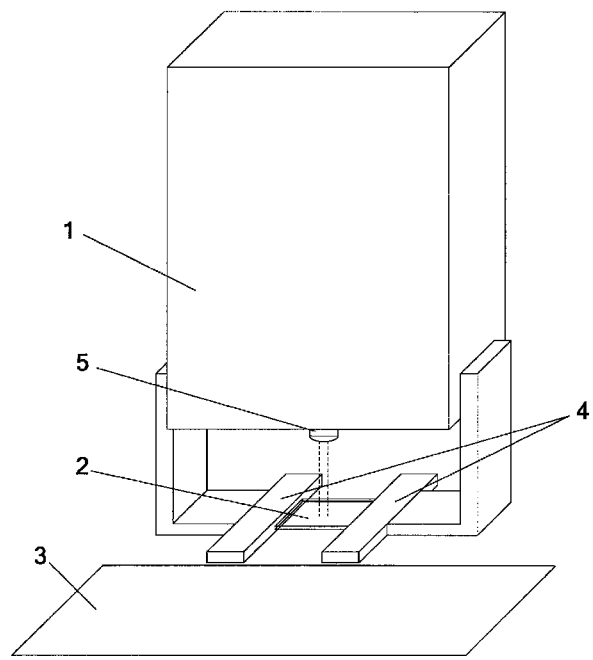
FIG. 2 is a structurally schematic view showing a laser repairing apparatus for a substrate provided by an embodiment of the present invention.
Figure 3:
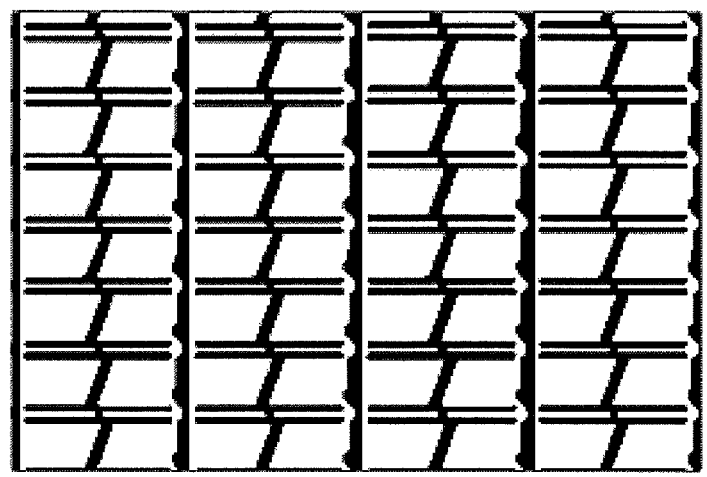
FIG. 3 is a schematic view showing a light-shielding pattern of a light transmission sheet in the laser repairing apparatus for the substrate provided by the embodiment of the present invention.

As shown in FIG. 2, according to an embodiment of the invention, there is provided a laser repairing apparatus for a substrate, comprising a laser emitter 1 and a light transmission sheet 2 with a light-shielding pattern. A laser emitted by the laser emitter 1 is used to cut a superfluous remainder of an electrode on a substrate 3. The light transmission sheet 2 is located between the laser emitter 1 and the substrate 3, and as compared to a pattern of the electrode on the substrate 3, the light-shielding pattern (as shown in FIG. 3) on the light transmission sheet 2 has the same shape and a size at a predetermined ratio. For example, the light transmission sheet 2 can be located on a light path of the laser which is emitted from the laser emitter 1 and reaches the substrate.

As compared to the electrode pattern on the substrate 3, the light-shielding pattern on the light transmission sheet 2 has the same shape and the size at the predetermined ratio. The light transmission sheet 2 is placed between the laser emitter 1 and the substrate 3 and is adjusted to be at a proper location, so that a pattern that is projected by the light-shielding pattern onto the substrate 3 upon radiation with the laser coincides with the pattern of the electrode. For example, while the laser emitted by the laser emitter 1 has a suitable diffusing angle, it is possible to make a ratio of a distance from the laser emitter 1 to the light transmission sheet 2 to a distance from the laser emitter 1 to the substrate 3 be equal to a size ratio of the light-shielding pattern on the light transmission sheet 2 to the electrode pattern, so that the pattern that is projected by the light-shielding pattern onto the substrate 3 upon radiation with the laser coincides with the pattern of the electrode. Certainly, the light transmission sheet may be attached to the substrate in extreme circumstances, and then the ratio relationship between the size of the light-shielding pattern and the size of the electrode pattern is 1:1. In addition, the light transmission sheet does not need to cover the whole electrode pattern, and it is also possible that the projection of the light-shielding pattern upon radiation with the laser only coincides with a part of the electrode pattern, and the superfluous remainder is guaranteed within this part. That is, the whole scope of a region, which is projected by the light-shielding pattern onto the substrate upon radiation with the laser, fully covers the superfluous remainder. Further, the laser emitted by the laser emitter 1 irradiates onto the substrate only through the light transmission sheet with the light-shielding pattern, and will not irradiate onto a region outside the light transmission sheet, so as to prevent the laser from damaging a normal electrode pattern.

Upon emission of the laser, the laser will be blocked in part by the light-shielding pattern, the blocked part of the laser exactly corresponds to the electrode pattern on the substrate 3 as the pattern which is projected onto the substrate by the light-shielding pattern coincides with the pattern of the electrode, and therefore, the normal electrode pattern will not be damaged. Another part of the laser passes through the light transmission sheet 2 smoothly, this part corresponds to a blank portion of the electrode pattern on the substrate 3 and the superfluous remainder on the electrode is also located in this portion, and therefore, the laser can cut off the superfluous remainder.

To sum up, the light transmission sheet 2 is capable of protecting the normal electrode pattern from being damaged by the laser, and making the laser emitted to other portion where the superfluous remainder is present, cutting of the superfluous remainder without adjusting location of the laser many times is realized, and speed of repairing the electrode is remarkably increased. Thus, a technical problem that speed of repairing an electrode is too slow in prior art is solved. Besides, as compared with a method in which a little-by-little cutting is performed by an operator in prior art, the light-shielding pattern is used to guarantee that the resultant pattern after cutting is the same as the normal pattern of the electrode according to the embodiment of the invention, to thereby further enhance accuracy and success rate for repairing.

In the embodiment of the invention, there is further included a light-transmission-sheet switcher 4, which is useful for switching light transmission sheets 2 with different light-shielding patterns. A set of laser repairing apparatus will be used to repair many different electrode patterns, such as electrode patterns for a gate, source and drain, and therefore, the light transmission sheets 2 with various light-shielding patterns shall be equipped. The light-transmission-sheet switcher 4 can be useful for switching corresponding light transmission sheets 2 according to a different electrode patterns.

The light-transmission-sheet switcher 4 can also be used to adjust location of the light transmission sheet 2, so that the pattern which is projected by the light-shielding pattern onto the substrate upon irradiation with the laser coincides with the pattern of the electrode. As such, it is possible that the substrate 3 is firstly fixed, and then the light transmission sheet 2 is adjusted according to the location of the substrate 3. In this case, the process of adjusting a relative location of the light transmission sheet 2 and the substrate 3 is more convenient, and is also more precise.

In the embodiment of the invention, there is further included a lens 5 disposed at an emitting end of the laser emitter 1. As the electrode pattern on the substrate is relatively fine, the lens 5 is used to magnify it several times or dozens of times, so as to facilitate finding of a specific location of the superfluous remainder and adjustment of the light transmission sheet 2. Setting the lens 5 at the emitting end of the laser emitter 1 can decrease a position difference between a viewing point and an emitting point and assure the accuracy of repairing. The laser will pass through the lens 5 upon emission, but the lens 5 will not bring an effect on the laser.

Embodiment 2

Figure 5:
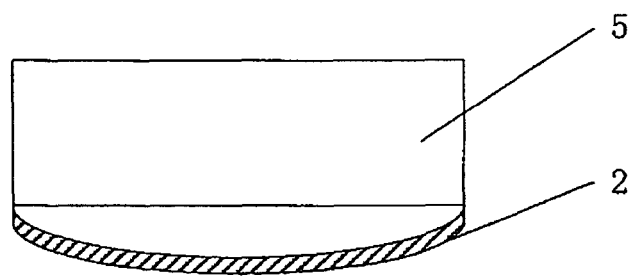
FIG. 5 is a schematic view showing a light transmission sheet disposed on a lens.

The embodiment is substantially the same as the embodiment 1, but differs in that: a light transmission sheet is disposed on a lens (FIG. 5). As a preferred scheme, the lens is disposed at the emitting end of the laser emitter 1, and the light transmission sheet is attached to an optic of the lens. As the laser passes through the lens, it also passes through the light transmission sheet, thereby realizing repair of the electrode pattern. As such, the light-transmission-sheet switcher can be omitted, so that volume of the laser repairing apparatus is smaller, and space is further saved. For a different electrode pattern, it is possible to change to a lens with a different light-shielding pattern, so that the light-shielding pattern matches the electrode pattern.

Embodiment 3

According to an embodiment of the invention, there is further provided a laser repairing method for a substrate, comprising:

S1: selecting a light transmission sheet with a light-shielding pattern according to a pattern of an electrode on the substrate to be repaired, wherein, as compared to the pattern of the electrode to be repaired, the light-shielding pattern has the same shape and a size at a predetermined ratio.

S2: placing the light transmission sheet between a laser emitter and the substrate.

S3: adjusting location of the light transmission sheet or the substrate, so that a pattern which is projected by the light-shielding pattern onto the substrate upon irradiation with a laser emitted by the laser emitter coincides with the pattern of the electrode.

S4: emitting the laser toward a superfluous remainder on the electrode by the laser emitter.

The aforesaid S1 to S3 each can be accomplished by a light-transmission-sheet switcher, because the light-shielding pattern on the selected light transmission sheet and the electrode pattern on the substrate have the same shape, and the light transmission sheet is placed between the laser emitter and the substrate by using the light-transmission-sheet switcher. Further, the light-transmission-sheet switcher can be used to adjust location of the light transmission sheet, so that the pattern which is projected by the light-shielding pattern onto the substrate upon irradiation with the laser coincides with the pattern of the electrode. For example, in the event that the laser emitted by the laser emitter has a suitable diffusing angle, it is possible to make a ratio of a distance from the laser emitter to the light transmission sheet to a distance from the laser emitter to the substrate be equal to a size ratio of the light-shielding pattern on the light transmission sheet to the electrode pattern, so that the pattern that is projected by the light-shielding pattern upon radiation with the laser coincides with the pattern of the electrode. Upon emission of the laser, the laser will be blocked in part by the light-shielding pattern, and as the pattern which is projected onto the substrate by the light-shielding pattern upon irradiation with the laser coincides with the electrode pattern on the substrate, a normal electrode pattern will not be damaged. Another part of the laser passes through the light transmission sheet smoothly, this part corresponds to a blank portion of the electrode on the substrate and the superfluous remainder on the electrode is also located in this portion, and therefore, the laser can cut off the superfluous remainder.

In addition, in the embodiment, for example, the whole scope of a region, which is projected by the light-shielding pattern on the light transmission sheet onto the substrate upon radiation with the laser, fully covers the superfluous remainder to be removed.

To sum up, the light transmission sheet is capable of protecting the normal electrode pattern from being damaged by the laser, and making the laser emitted to other portion where the superfluous remainder is present, cutting of the superfluous remainder without adjusting location of the laser many times is realized, and speed of repairing the electrode is remarkably increased. Thus, a technical problem that speed of repairing an electrode is too slow in prior art is solved. Besides, as compared with a method in which a little-by-little cutting is performed by an operator in prior art, the light-shielding pattern is used to guarantee that the resultant pattern by cutting is the same as the normal pattern of the electrode according to the embodiment of the invention, to thereby further enhance accuracy and success rate for repairing.

As a laser repairing apparatus provided by the embodiment of the invention has the same technical features as those provided by the aforementioned embodiments of the invention, the same technical effect can also be produced and the same technical problem can be solved.

Embodiment 4

Figure 6:
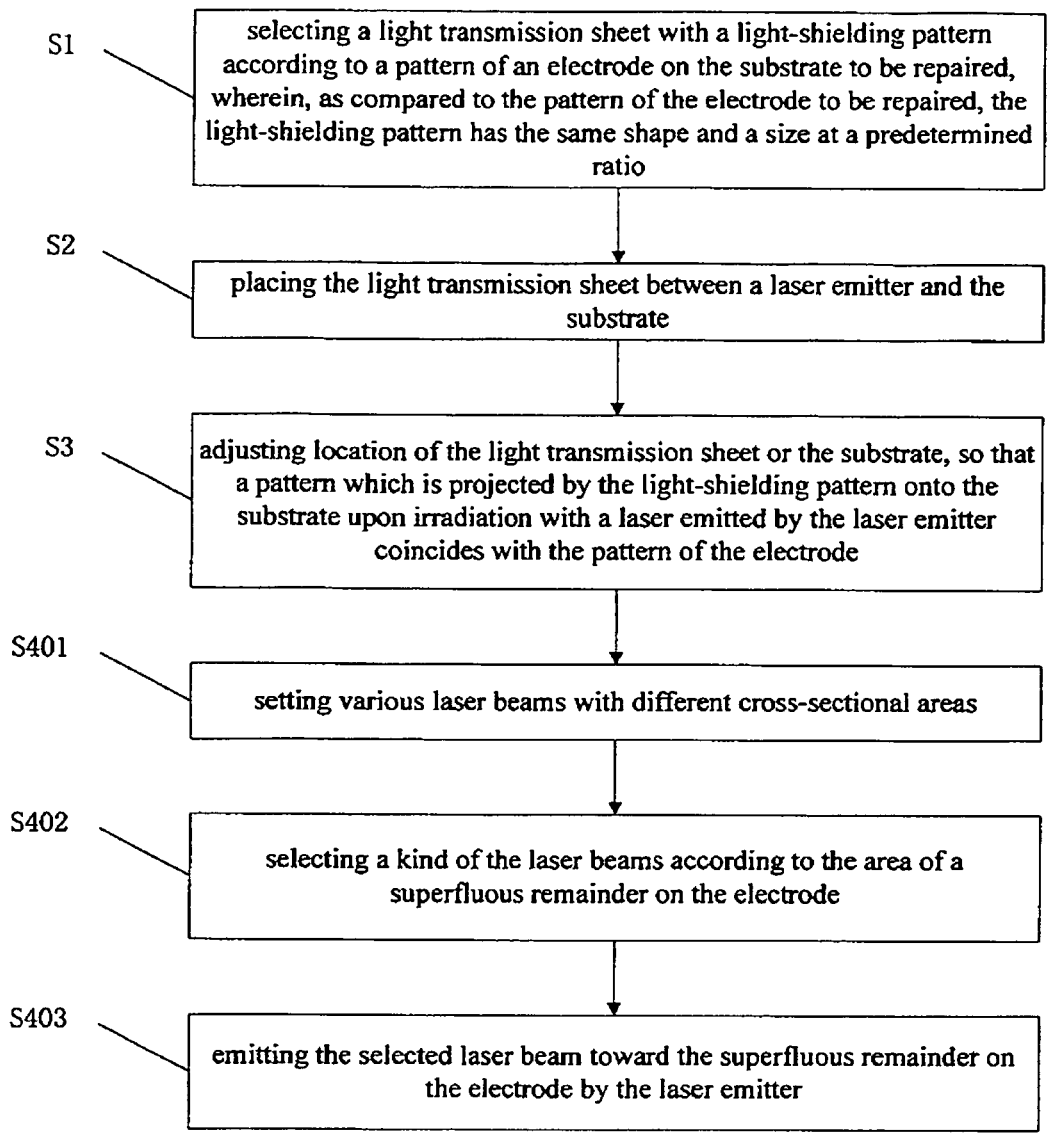
FIG. 6 is a flowchart showing a laser repairing method according to an embodiment of the present invention.

The embodiment of the invention is substantially the same as the embodiment 3, but differs in the step S4, that is, the laser is emitted toward the superfluous remainder on the electrode by the laser emitter. Referring to FIG. 6, step S4 in the embodiment specifically includes:

S401: setting various laser beams with different cross-sectional areas.

S402: selecting a kind of the laser beams according to the area of a superfluous remainder on the electrode.

Specifically, the area of the selected laser beam (i.e., the area of a light spot irradiated on the substrate by the laser beam) only needs to be slightly larger than that of the superfluous remainder, so that the laser beam fully covers a pattern of the remainder.

S403: emitting the selected laser beam toward the superfluous remainder on the electrode by the laser emitter.

The light transmission sheet is capable of protecting a normal electrode pattern from being damaged by the laser, and making the laser emitted to other portion where the superfluous remainder is present, cutting of the superfluous remainder without adjusting location of the laser many times is realized. The repair is completed only if the laser is emitted once, and speed of repairing the electrode is remarkably increased, to thereby solve a technical problem that speed of repairing an electrode is too slow in prior art. Besides, as compared with a method in which a little-by-little cutting is performed by an operator in prior art, the light-shielding pattern is used to guarantee that the resultant pattern by cutting is the same as the normal pattern of the electrode according to the embodiment of the invention, to thereby further enhance accuracy and rate of success for repairing.

Embodiment 5

The embodiment of the invention is substantially the same as the embodiment 3, but differs in the step S4, that is, the laser is emitted toward the superfluous remainder on the electrode by the laser emitter. The step S4 in the embodiment specifically includes:

S411: setting a kind of laser beam with a fixed area.

Specifically, the area of the laser beam should be as small as possible so as to facilitate that the total amount of the light emitted by the laser is controlled by use of the number of emitting the laser, and the shape of the laser beam is such as a square. That is, the area of a light spot irradiated onto the substrate by the laser beam is smaller than the area of the superfluous remainder.

S412: enclosing a target region around the periphery of superfluous remainder on the electrode, so that the entirety of the superfluous remainder is completely located within the target region.

Specifically, an operator can circle the target region on an operational interface by using a mouse, and the shape of the target region is, for example, a square.

S413: dividing the target region into a number of sub-regions, the area of each sub-region being equal to or less than the area of the light spot irradiated onto the substrate by the set laser beam.

Figure 4:
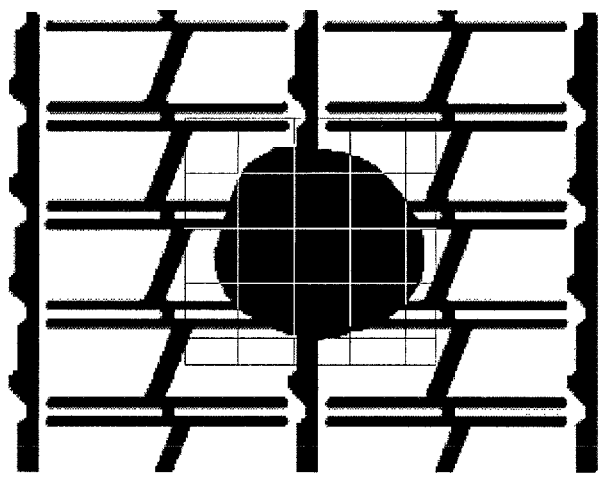
FIG. 4 is a schematic view showing a target region being divided into a number of sub-regions in a laser repairing method for a substrate provided by an embodiment of the present invention.

Specifically, as shown in FIG. 4, because each of the target region and the laser beam takes a shape of square, the target region is divided into a number of sub-regions with the area of one laser beam as a unit. However, the length of a side of the target region is not necessary to be the integer times of the length of a side of the laser beam. Accordingly, the area of a sub-region on the corner may be smaller than the area of the laser beam.

S414: emitting the laser beam toward each of the sub-regions in sequence by the laser emitter.

The light transmission sheet is capable of protecting a normal electrode pattern from being damaged by the laser, and making the laser emitted to other portion where the superfluous remainder is present, cutting of the superfluous remainder without adjusting location of the laser many times is realized. The repair is completed only if the same kind of laser beam is emitted consecutively, and speed of repairing the electrode is remarkably increased, to thereby solve a technical problem that speed of repairing an electrode is too slow in prior art. Besides, as compared with a method in which a little-by-little cutting is performed by an operator in prior art, the light-shielding pattern is used to guarantee that the resultant pattern by cutting is the same as the normal pattern of the electrode according to the embodiment of the invention, to thereby further enhance accuracy and success rate for repairing.

In a specific application, because it is required that the diameter of the laser beam be as small as possible, and the lens 5 disposed at a front-end of the laser emitter 1 will cause the beam diameter of the passing laser beam to increase so as to affect accuracy of repairing, the lens 5 can be disposed on a side of the laser emitter 1 on which a light exiting port is located. As such, not only the diameter of the laser beam can be decreased, but also the location of the remainder and the effect of repairing the remainder can be detected by the lens.

The descriptions made above are merely the specific embodiments of the present invention, but the protection scope of the present invention is not limited thereto. Modifications or replacements, which are easily conceived by those skilled in the art within the technical scope disclosed by the present invention, should be embraced within the protection scope of the present invention. Therefore, the protection scope of the present invention should be defined by the protection scope of attached claims.

What is claimed is:

1. A laser repairing apparatus for a substrate, comprising:
a laser emitter; and
a light transmission sheet with a light-shielding pattern,
wherein a laser emitted by the laser emitter is used to cut a superfluous remainder of an electrode on the substrate,
the light transmission sheet is located between the laser emitter and the substrate, and
as compared with a pattern of the electrode to be retained on the substrate, the light-shielding pattern on the light transmission sheet has the same shape and a size at a predetermined ratio as the entire pattern of the electrode to be retained.

2. The laser repairing apparatus claimed as claim 1, wherein the light transmission sheet is located on a light path of the laser which is emitted by the laser emitter and reaches the substrate.

3. The laser repairing apparatus claimed as claim 1, further comprising a light-transmission-sheet switcher for switching light transmission sheets with different light-shielding patterns.

4. The laser repairing apparatus claimed as claim 3, wherein the light-transmission-sheet switcher is able to adjust the location of the light transmission sheet between the laser device and the substrate, so that a pattern which is projected by the light-shielding pattern on the light transmission sheet onto the substrate upon irradiation with the laser emitted by the laser emitter coincides with the pattern of the electrode.

5. The laser repairing apparatus claimed as claim 1, further comprising a lens disposed at an emitting end of the laser emitter or on a side of the laser emitter.

6. The laser repairing apparatus claimed as claim 5, wherein the lens is disposed at the emitting end of the laser emitter, and the light transmission sheet is disposed on the lens.

7. A laser repairing method for a substrate, comprising:
selecting a light transmission sheet with a light-shielding pattern according to a pattern of an electrode on the substrate to be repaired, wherein, as compared with the pattern of the electrode to be retained, the light-shielding pattern has the same shape and a size at a predetermined ratio as the entire pattern of the electrode to be retained;
placing the light transmission sheet between a laser emitter and the substrate;
adjusting the location of the light transmission sheet or the substrate, so that a pattern which is projected by the light-shielding pattern onto the substrate upon irradiation with a laser emitted by the laser emitter coincides with the pattern of the electrode; and
emitting the laser toward a superfluous remainder on the electrode by the laser emitter.

8. The laser repairing method claimed as claim 7, wherein a whole scope of a region which is projected by the light-shielding pattern onto the substrate upon irradiation with the laser fully covers the superfluous remainder.

9. The laser repairing method claimed as claim 7, wherein the step of emitting the laser toward the superfluous remainder on the electrode by the laser emitter comprises;
setting various laser beams with different cross-sectional areas;
selecting one kind of the laser beams according to the area of the superfluous remainder on the electrode; and
emitting the selected laser beam toward the superfluous remainder on the electrode by the laser emitter.

10. The laser repairing method claimed as claim 9, wherein, selecting the one kind of the laser beams so that the area of a light spot irradiated on the substrate by the laser beam fully covers the superfluous remainder.

11. The laser repairing method claimed as claim 7, wherein the step of emitting the laser toward the superfluous remainder on the electrode by the laser emitter comprises:
setting a laser beam, so that the area of a light spot irradiated onto the substrate by the laser beam is smaller than the area of the superfluous remainder;
enclosing a target region around the periphery of superfluous remainder on the electrode, so that the entirety of the superfluous remainder is completely located within the target region;
dividing the target region into a number of sub-regions, the area of each of the sub-regions being equal to or less than the area of the light spot irradiated onto the substrate by the laser beam; and
emitting the laser beam toward each of the sub-regions in sequence by the laser emitter.

* * * * *